M. Van Auken,

Washing Machine,

No. 748. Reissued June 28, 1859.

Witnesses;
John T. Gaus
James A. Lowry

Inventor;
M. Van Auken

UNITED STATES PATENT OFFICE.

MINER VAN AUKEN, OF SARATOGA SPRINGS, NEW YORK.

IMPROVED WASHING-MACHINE.

Specification forming Letters Patent No. 20,230, dated May 11, 1858; Reissue No. 748, dated June 28, 1859.

*To all whom it may concern:*

Be it known that I, MINER VAN AUKEN, formerly of Chazy, in the county of Clinton and State of New York, and now of Saratoga Springs, in the county of Saratoga and State of New York, have invented a new and Improved Clothes-Washing Machine; and I do hereby declare that the following is a full, clear, and exact description of the same, reference being had to the accompanying drawings, forming a part of this specification, in which—

Figure 1:
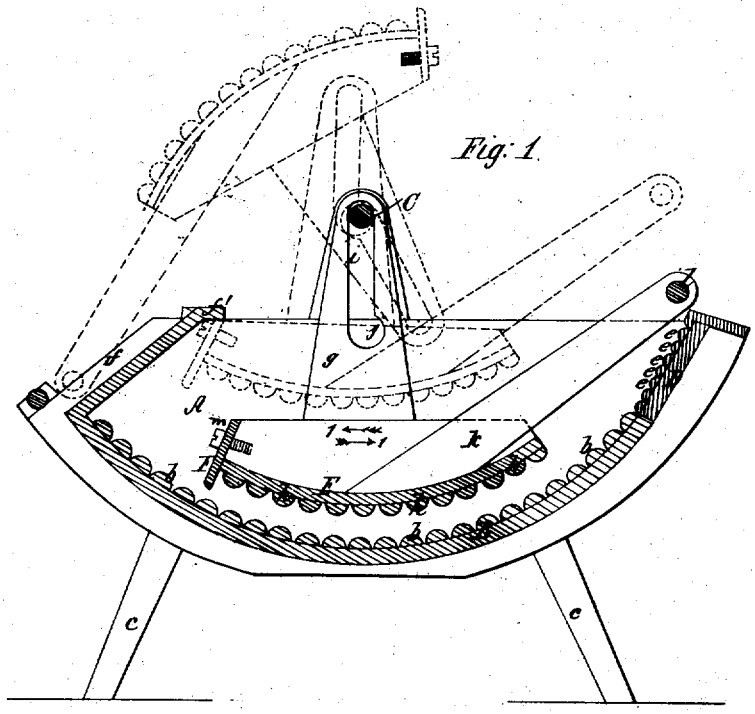
Figure 2:
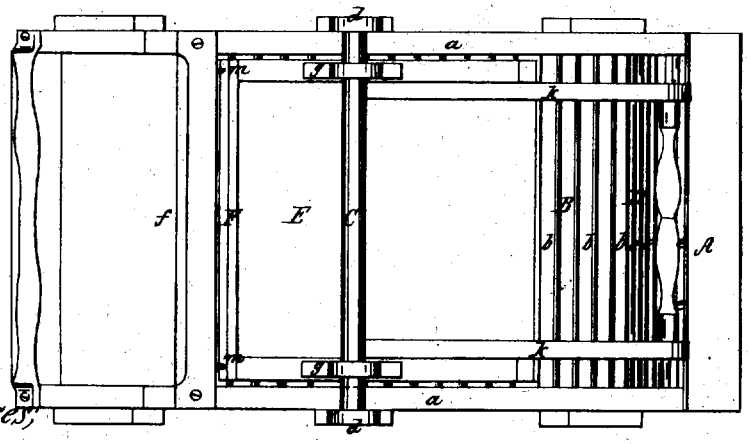

Figure 1 is a side sectional view of my improvement, and Fig. 2 is a plan or top view of the same.

Similar letters of reference in each of the several figures indicate corresponding parts.

The nature of my invention consists, first, in providing a stop-board at the lower portion of the rear end of the rubber; second, in providing an oblong slot whose lower termination is of scroll form in each of the pendulous arms of the rubber; third, in the combination with said slot of a back trip-board.

By the first feature of my invention the passage of the clothes behind the rubber during the washing operation is prevented, and thus the clothes are always kept wholly underneath the rubber. By the second feature the rubber can be suspended above the clothes and have an axis to turn upon at the time when it is being swung to a proper rubbing position; and thus is avoided the catching against and forcing of the clothes which may have been placed in the tub toward the back board of the tub. The rubber can also be inverted and supported in an inclined position, so as to drip toward the rear end of the tub, and thus no annoyance or inconvenience in managing the rubber while removing and inserting clothes into the tub is experienced, as the peculiarity of the scroll-slot affords facilities for thus throwing the rubber up so that it may be completely inverted and still be sustained in that position; and by the third feature of my invention the rubber can be released from the scroll-bearing portion of the slots by simply being turned over with a sudden motion so as to strike the back trip-board, and thus allowed to fall upon the clothes.

To enable others skilled in the art to make and use my invention, I will proceed to describe its construction and operation.

A represents a box having parallel sides *a a* and a concave bottom, B, the inner surface of which is provided with transverse ribs or projections *b*, of semi-cylindrical or other proper form, placed at suitable distance apart to form a corrugated surface. (See Fig. 1.) The box A is supported at a suitable height by legs *c*, and an upright, *d*, is attached to each side *a* of the box A, the upper ends of said uprights being connected by a stationary rod or shaft, C. The bottom B of the box is a portion of a circle of which the axis of the shaft or rod C is the center, and at the front end of the box and adjoining the bottom B a corrugated surface, D, is formed by having transverse ribs or projections *e* attached of smaller width or diameter than those on the bottom B. The part or surface D need not form a part of the same circle as B, but may be perfectly straight, the ribs *e* being attached to a plan surface, as plainly shown in Fig. 1.

To the back end of the box A an inclined board, *f*, is attached. This board has a horizontal extension, *f'*, formed on it for a purpose presently described.

On the rod or shaft C two pendent bars, *g g*, are placed, and to the lower ends of these bars a curved rubber, E, is attached. This rubber is formed by attaching a curved or segment board to the bars *g g*, the curvature forming a portion of a smaller circle than B, but concentric with it. Transverse ribs or projections *h h*, corresponding with the ribs on the bottom B, are attached to the under or face side of E, as shown plainly in Fig. 1. The bars *g g* are slotted longitudinally at their upper ends, as shown at *i*, Fig. 1, and the rod or shaft C passes through said slots. The slots *i* resemble a scroll at their lower termination, as shown clearly in Fig. 1.

To the front end of the rubber E two inclined bars, *k k*, are attached, said bars being connected at their outer ends by a cross-piece, *l*, which serves as a handle. The bars *k k* project toward the front end of box A.

To the back end of the rubber E a board or strip, F, is attached by set-screws *m m*, said set-screws passing through slots in the strip or board whereby the same is rendered adjustable. The board or strip F extends the whole width of the rubber, and its lower edge projects below the surface of the rubber, as shown clearly in Fig. 1.

The board is found in practice to answer a good purpose by being adjustable; but as I believe I am the first one who ever used a stop-board, I wish to secure, broadly, the use of such a board however attached or applied, so long as it acts as a back stop against the clothes, as described.

The operation is as follows: The box A is supplied with a requisite quantity of suds, and the clothes G are placed therein, the rubber E resting on the clothes. The operator then grasps the handle or cross-piece *l* and moves the rubber E back and forth, as indicated by the arrows 1, and the clothes G are thereby subjected to a pressure and rubbing action sufficient to deprive them in a reasonable time of the greater part of dirt they may have contained. The board or strip F keeps the clothes G always underneath the rubber, preventing them from working back and getting beyond its action, while in consequence of the relative position of the bars *k* with the rubber E a leverage power is obtained and the strength of the operator applied in the most advantageous manner. When the clothes have been subjected a requisite time to the action of the rubber E, the operator raises it so that the scroll termination of the slots will catch over the shaft or rod C, and the rubber is turned over, bottom side up, so that it will be held and supported in an inclined position while thus inverted, as illustrated in red color. This position of the rubber allows the operator to handle the clothes, rendering every piece accessible, and while this is going on she is not annoyed by the water dripping upon her, as the inclined set of the rubber insures the dripping of the water toward the rear end of the tub, and the operator may also then rub by hand on the part D, which is merely an ordinary wash-board, such parts of the clothes as were not fully cleansed by the rubber E, such as the wristbands of shirts, &c., parts that always require much more labor than others in order to be cleansed perfectly, and which, if operated upon sufficiently by the rubber E to be cleansed, would subject other portions to unnecessary wear. The hand rubbing and the work of the rubber E may be done alternately until the clothes are cleansed. The rubber may also, when it is desirable, only be raised to the position shown in black dotted lines and still have an axis to swing upon while being adjusted to take hold of the clothes at a proper place; and when it is desired to lower the rubber again upon the clothes from the elevated position shown in red all that has to be done in order to accomplish this is to turn over the rubber suddenly from the position shown in red, and thereby bring the rear end of the rubber with sufficient force against the extension *f'* to cause its shaft to move in line with the straight part of the slots so that it may descend through the same free of the scroll portions.

What I claim as my invention, and desire to secure by Letters Patent, is—

1. Providing a stop-board at the lower portion of the rear end of the rubber, substantially as and for the purposes set forth.

2. Providing an oblong slot, the lower termination of which is of scroll form, in each of the pendulous arms of the rubber, substantially as and for the purposes set forth.

3. The combination, with said slot, of a back trip-board, substantially as and for the purposes set forth.

M. VANAUKEN.

Witnesses:
J. A. SHOUDY,
JOHN T. CARR.